No. 705,491. Patented July 22, 1902.
E. VAN NOORDEN.
GLAZED ROOF OR STRUCTURE.
(Application filed Feb. 13, 1902.)
(No Model.)

WITNESSES:
INVENTOR:
E. Van Noorden

UNITED STATES PATENT OFFICE.

EZEKIEL VAN NOORDEN, OF BOSTON, MASSACHUSETTS.

GLAZED ROOF OR STRUCTURE.

SPECIFICATION forming part of Letters Patent No. 705,491, dated July 22, 1902.

Application filed February 13, 1902. Serial No. 93,833. (No model.)

*To all whom it may concern:*

Be it known that I, EZEKIEL VAN NOORDEN, a citizen of the United States, and a resident of Boston, in the county of Suffolk and State of Massachusetts, have invented a new and useful Improvement in Glazed Roofs or Structures, of which the following is a full, clear, and exact description, reference being had to the accompanying drawings, forming a part of this specification, in explaining its nature.

The invention relates to means for supporting and holding panes of glass and for providing the structure with interior means of condensation-drainage.

I will now describe the invention in connection with the drawings forming a part of this specification, in which—

Figure 1:
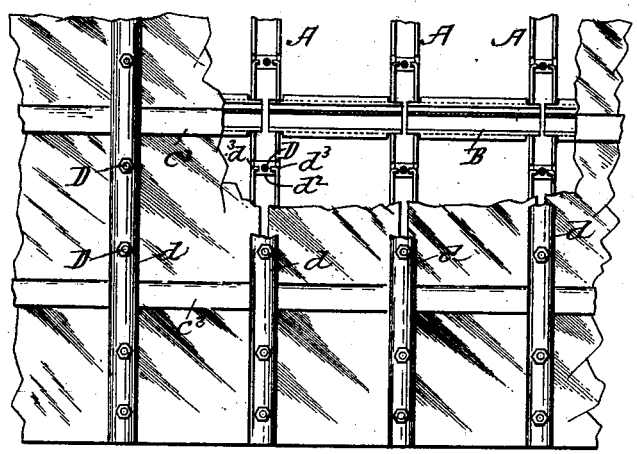
Figure 2:
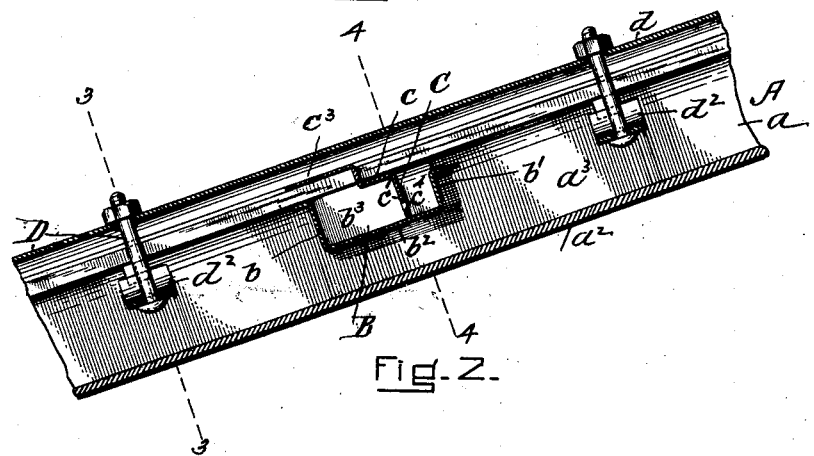
Figure 3:
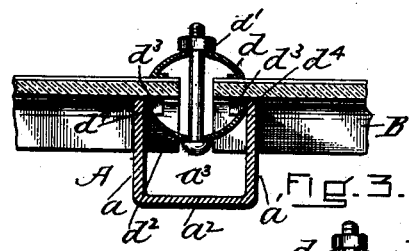
Figure 4:
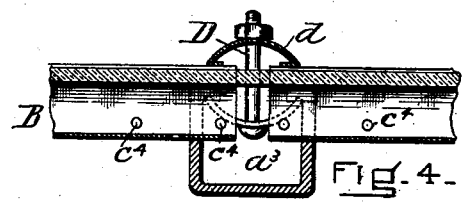
Figures 5, 6:
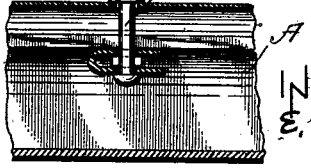

Figure 1 is a view, principally in plan, of a portion of a glazed structure having my improvement. Fig. 2 is a view in vertical section thereof. Fig. 3 is a view in cross-section upon the dotted line 3 3 of Fig. 2. Fig. 4 is a view in cross-section upon the dotted line 4 4 of Fig. 2. Figs. 5 and 6 illustrate sectional views of a modified form, to which reference is hereinafter made.

Referring to the drawings, A represents channel-bars or other similar metal structure having parallel sides $a$ $a'$ and a bottom $a^2$. These channel-bars are arranged with their open sides uppermost, generally parallel with each other, and upon suitable supports. They are usually inclined and arranged at about the width of a pane of glass apart and so that the panes will meet over the center of the opening, and they serve in part as direct supports for panes of glass as well as for the support of cross-channels, which may also serve to assist in supporting the glass and also as a means for receiving and removing the drip of condensation and leakage.

$a^3$ is the drainage-channel.

Each bar has sections of its sides $a$ $a'$ removed to provide room for the cross glass-supports B. These supports have the relatively high lower side $b$, the relatively low upper side $b'$, and the bottom $b^2$, and they form troughs or channels $b^3$, which open into the channels $a^3$ of the bars A and being of such lengths that their ends terminate in said channels. They serve to support the edges of the panes of glass at right angles to the edges supported by the bars A, the panes resting upon the upper edge of the side $b$, which may be provided with a flange to furnish a broad support, and upon the shoulder $c$ of a clip C, which has a downward-extending portion $c'$ to the bottom $b^2$ of the support and which has an upward extension $c^2$ between the panes and a flange $c^3$, which bears upon one of them, the clip thus serving both as a pane-rest and a pane down-retainer. The upper side $b'$ of the cross-support is made lower in order that underneath pane-drip may enter the trough without coming into contact with the upper side. It would come in contact with the clip and run down its surface into the portion of the trough above it, and in order that it may not be retained therein the portion $c'$ of the clip where it bears upon the bottom is provided with holes $c^4$, through which the accumulated drip may pass into the main part of the trough below. The panes of glass and the cross-supports are held to the bars A by means of bow-caps $d$ of a width to span the joint between the two lines of panes, having feet to rest upon the surface thereof and bolt-holes $d'$ and holding-clips $d^2$ held in the channel $a^3$, oppositely curved to the curve of the caps $d$ and held in the channel against upward stress by ears $d^3$, integral with the walls $a$ $a'$ of the bar and formed, preferably, by striking inward toward each other into the channel-sections of the walls. These clip-holding ears may be so shaped as to provide upon their under surface the upward-extending notches $d^4$ for the reception of the ends of the clips $d^2$, which are drawn into them by the bolts D, which draw the clips and caps together, each clip having a hole for the reception of the bolt, the head of each bolt being on the under side of the clip and the bolt passing upward between the panes and through a hole $d'$ of the cap, presenting its threaded end uppermost and receiving a drawing and locking nut upon the upper side of the cap.

In Figs. 5 and 6 I have represented the cross-clip, the equivalent of the clips $d^2$, as not bowed, but as extending straight across the cavity of the bar A and as being formed from flat sheet metal bent at the center of its width to provide openings to receive the ears formed in from the sides $a$ $a'$ of the bar. This construction I consider an equivalent for that of the clip $d^2$. I would further say that the ears $d^3$ may be formed by setting in portions of the sides $a\ a'$ without cutting the sides, if so desired, the setting in of the sides forming holding projections upon the inner surface of the sides.

Having thus fully described my invention, I claim and desire to secure by Letters Patent of the United States—

1. In a glazed structure, the combination of the channel-bars, panes of glass having edges which rest thereon, integral ears upon the inner sides of the walls of the said channel-bars, clips bearing against the said ears, caps covering the joints between contiguous panes of glass, and bolts extending from the clips to the caps tying them together and the panes of glass to the channel-bars.

2. The combination of channel-bars having integral ears extending inward from their sides and provided with seats upon their under surfaces, downwardly-arched clips having ends held against said ear-seats, panes of glass supported by the channel-bars, caps covering the joints between them, and bolts extending from the clips through the caps and serving to hold the clips against the ears with their ends in the ear-seats, the caps against the outer surface of the glass panes and the panes upon the channel-bars.

3. The channel-bars having cross-recesses, cross-channel supports extending from said recesses and supported by the channel-bars, the said supports having outwardly-turned flanges from the edge of their upper and lower sides, the flanges from the edge of the lower side being adapted to laterally support the upper edge of the glass panes, while the flange from the upper edge is turned away to afford opportunity for the passing of drip upon the under surface of said panes to the channel, and independent clips bearing upon the bottom of the supports, having upon one side seats for panes of glass and extending between the panes and forming the outer down-holes for panes.

EZEKIEL VAN NOORDEN.

Witnesses:
F. F. RAYMOND, 2d,
J. M. DOLAN.